Oct. 9, 1928.  
E. R. VIBERG ET AL  
1,687,406  
DIRECTION VALVE FOR OPERATING DUMP CARS  
Filed Nov. 6 1926  
5 Sheets-Sheet 1
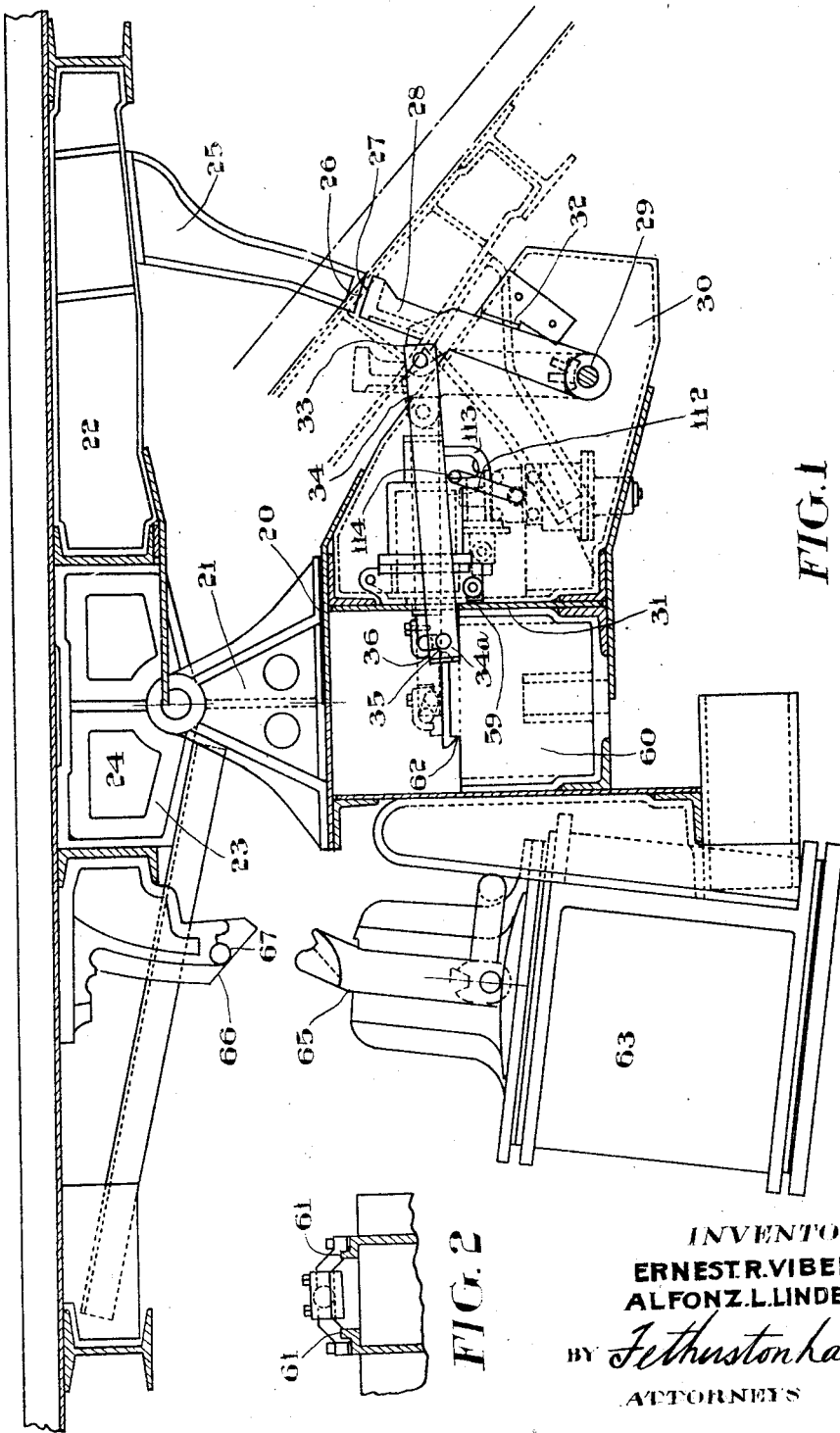
INVENTORS  
ERNEST R. VIBERG  
ALFONZ. L. LINDERBLAD  
BY Fetherstonhaugh & Co  
ATTORNEYS Oct. 9, 1928.
E. R. VIBERG ET AL
1,687,406
DIRECTION VALVE FOR OPERATING DUMP CARS
Filed Nov. 6 1926    5 Sheets-Sheet 2
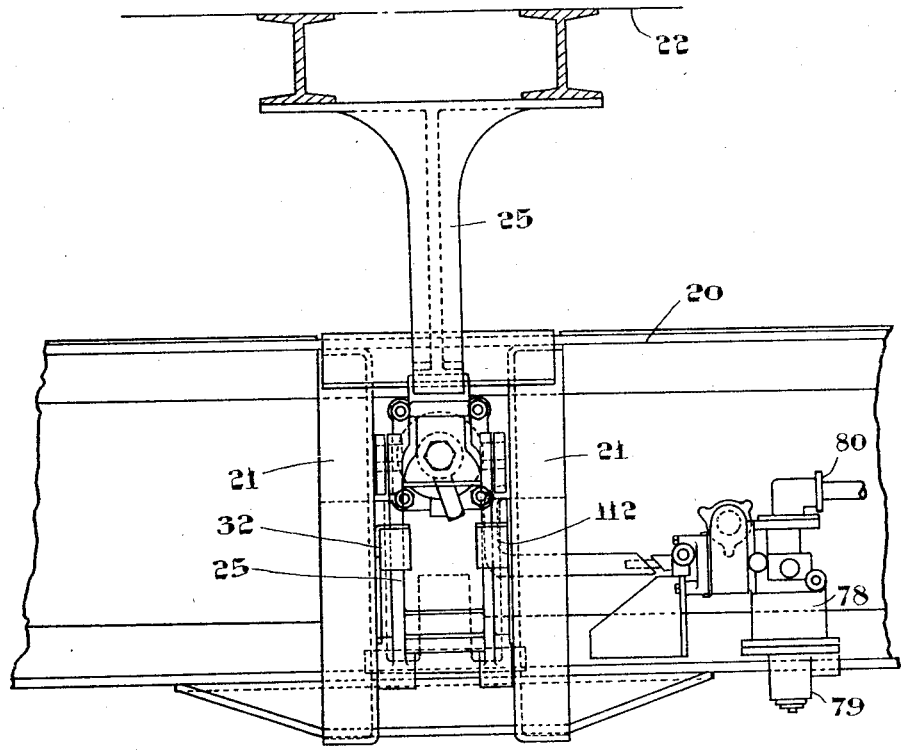
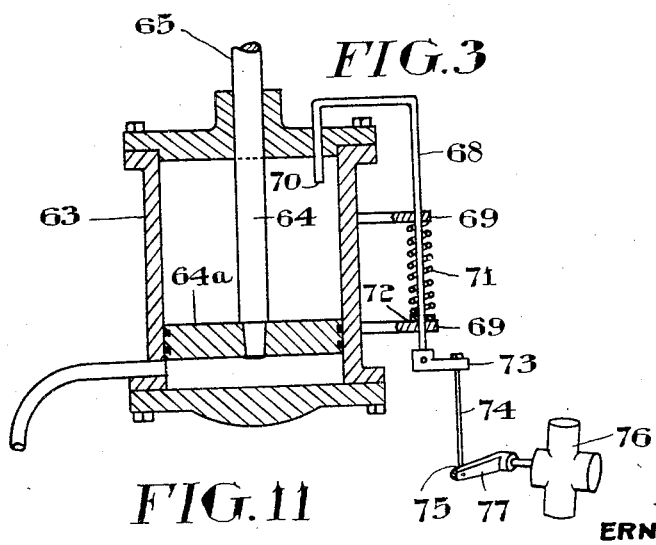
FIG.11
INVENTORS
ERNEST R. VIBERG
ALFONZ. L. LINDERBLAD
BY *Fetherstonhaugh & Co*
ATTORNEYS Oct. 9, 1928.

E. R. VIBERG ET AL 1,687,406

DIRECTION VALVE FOR OPERATING DUMP CARS

Filed Nov. 6, 1926    5 Sheets-Sheet 3

INVENTORS
ERNEST. R. VIBERG
ALFONZ. L. LINDERBLAD

BY Fetherstonhaugh&Co
ATTORNEYS

Oct. 9, 1928.  1,687,406
E. R. VIBERG ET AL
DIRECTION VALVE FOR OPERATING DUMP CARS
Filed Nov. 6 1926  5 Sheets-Sheet 4
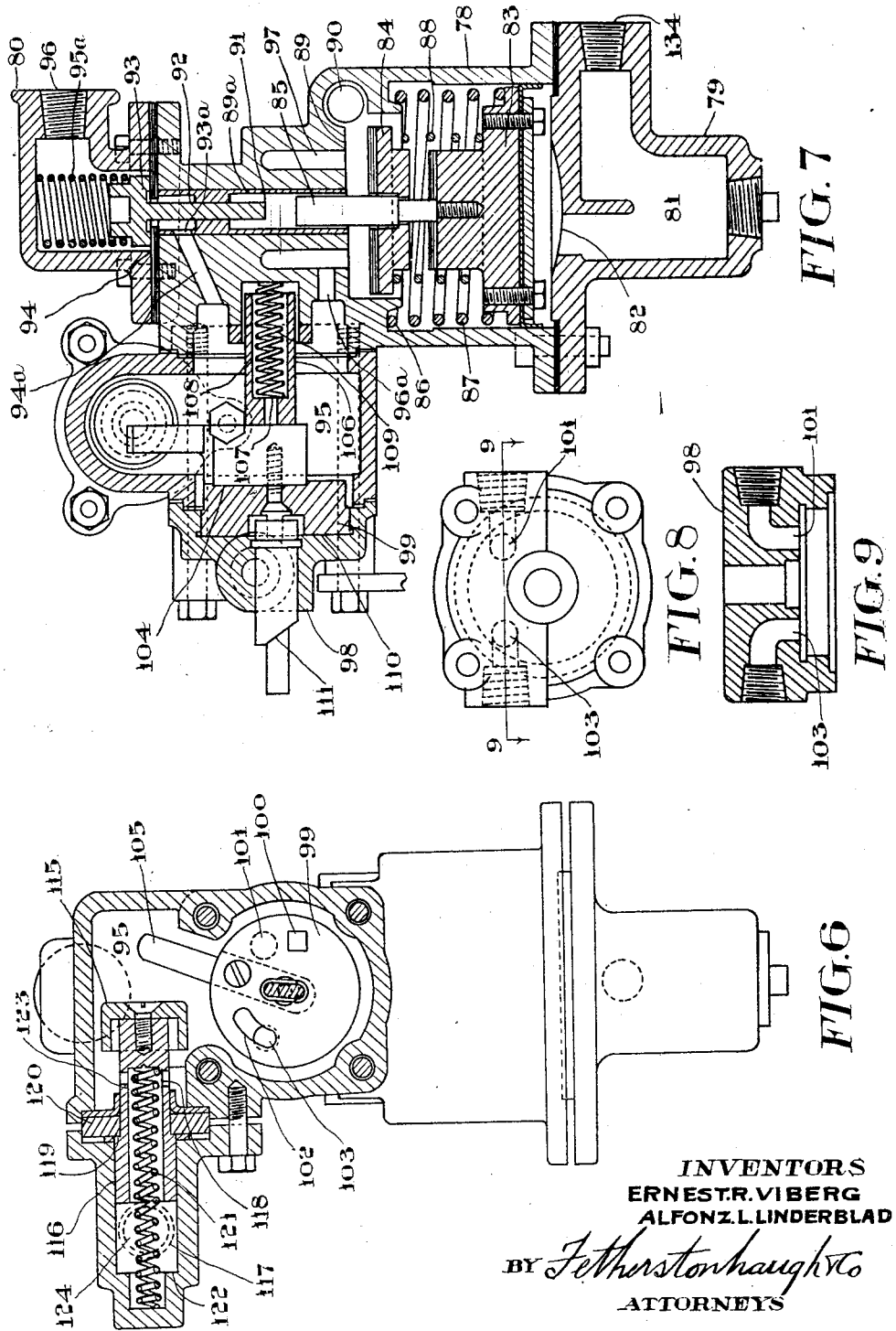
INVENTORS
ERNEST R. VIBERG
ALFONZ L. LINDERBLAD
BY Fetherstonhaugh & Co
ATTORNEYS

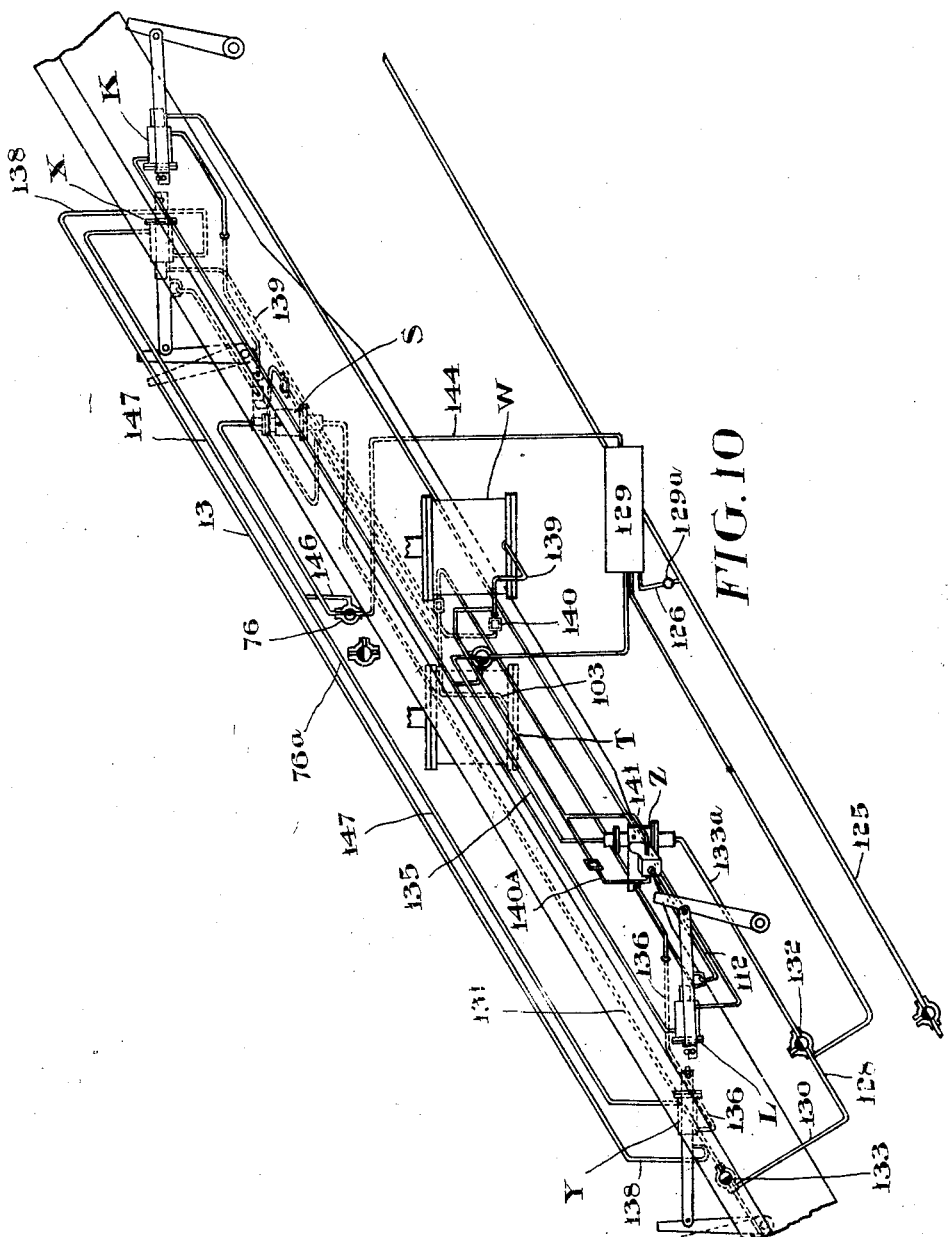

Patented Oct. 9, 1928.

1,687,406

UNITED STATES PATENT OFFICE.

ERNEST R. VIBERG AND ALFONZ L. LINDERBLAD, OF MONTREAL, QUEBEC, CANADA, ASSIGNORS TO CANADIAN CAR AND FOUNDRY COMPANY LIMITED, OF MONTREAL, CANADA.

DIRECTION VALVE FOR OPERATING DUMP CARS.

Application filed November 6, 1926. Serial No. 146,703.

This invention relates to new and useful improvements in dump cars, and particularly to the valve mechanism for controlling the operation of same, and the object of the invention is to provide a simple and efficient valve which will automatically control, and direct the fluid as it passes through the various elements comprising the car dumping mechanism.

Another object is to provide pneumatically controlled dumping mechanism for dump cars which will be easy to control and reliable in service.

A further object is to provide car dumping mechanism having locking means which will be positive in its action and which will operate with practically no wear on its moving parts or locking surface.

A still further object is to provide a dump car, the mechanism of which will be light in construction when compared with the types now generally in use.

A still further object is to provide a dump car which will be safe to operate and which will require very little attention once the dumping mechanism is installed.

In our invention we provide a movable truck or car body portion pivotally attached to the fixed centre sill of a car. The movable body portion is provided with depending struts which engage with movable arms pivotally attached through suitable supports to the bolster. Mounted on the centre sill are the stops which engage with eccentric locking bars connected by links to the ends of piston working in cylinders secured to the sills. The cylinders are so connected that in tipping the movable portion, the locking means is released, and the arms on one side pulled clear of the depending struts before the dumping cylinder on the opposite side is brought into operation. This is accomplished by control valves and specially constructed direction valves, the construction of which is such that the fluid from the supply line is controlled and directed in a proper manner through the various elements comprising the car dumping mechanism.

In the drawings which illustrate one form of our invention;—

Figure 1 is a part sectional end elevation of one end of the dump car showing the locking mechanism, the tipping mechanism, and the direction valve and the manner of securing them to the bolsters or centre sill.

Figure 2 is a part sectional side elevation showing the eccentric locking bar.

Figure 3 is a part sectional side elevation showing the locking mechanism and the direction valve.

Figure 6 is a part sectional side elevation of the fluid direction control valve.

Figure 7 is a sectional end elevation of the valve shown in Figure 6.

Figure 8 is a plan view of one of the caps for the valve shown in Figure 7.

Figure 9 is a sectional side elevation taken on the line 9—9 Figure 8.

Figure 10 is a perspective schematic view of the dumping and locking mechanism and the arrangement of piping used in the construction of the dump car.

Figure 11 is a sectional elevation of one of the dumping or tipping cylinders.

Figure 4:
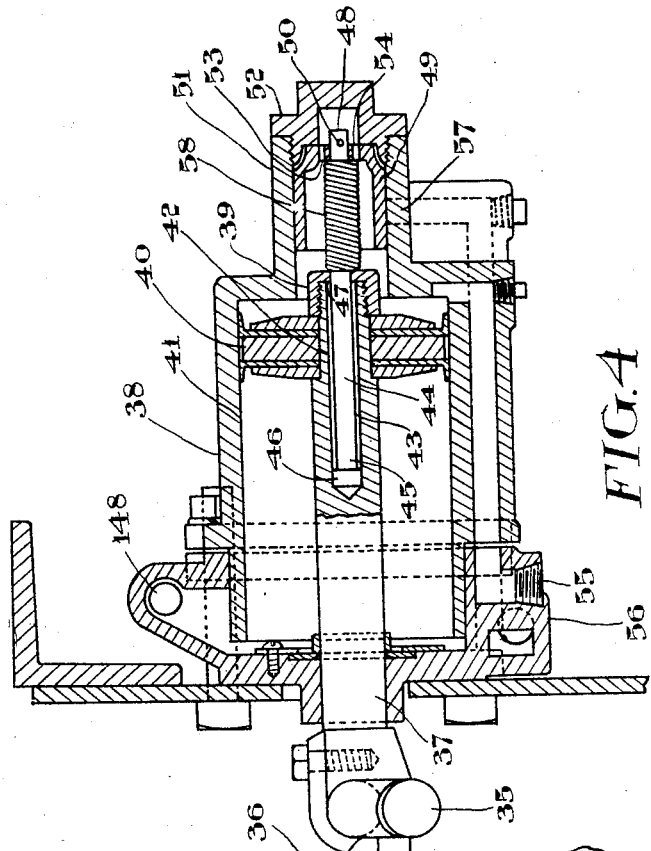
Figure 4 is a longitudinal section elevation of the locking cylinders.
Figure 5:
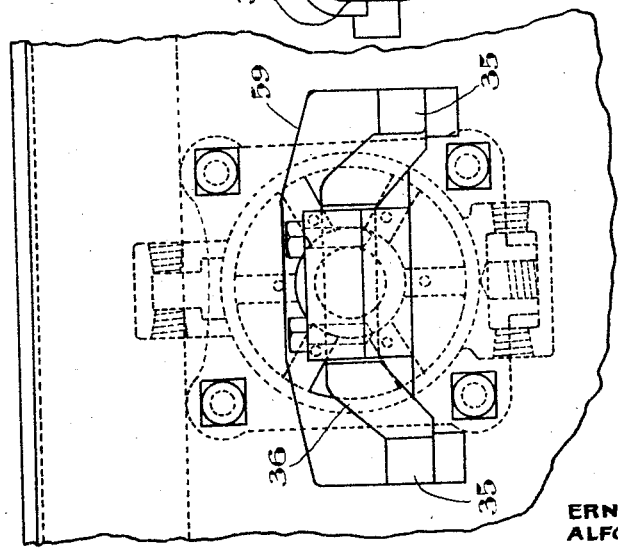
Figure 5 is an end elevation of the device shown in Figure 4.

Referring more particularly to the drawings, 20 designates the centre sill of a car attached in the usual manner to the side frames (not shown). Mounted on the centre sill are the brackets 21, which support the movable or dumping portion 22 of the car, through the medium of the brackets 23, secured to the underside of the portion 22 and shaft 24 passing through the brackets 21 and 23. The portion 22 may be built in any desired manner by means of structural shapes and plates, as shown in Figure 1. Depending from the underside of the frame or portion 22 and on each side of the longitudinal centre of the car, are the struts 25, the lowermost ends 26 of which are adapted to contact with the upper ends 27 of arms 28, which are pivotally mounted on pins 29 passing through brackets 30, secured to the side plates 31 of the centre sill. The struts and the arms are in contacting relationship only when the car is in the normal or loading position. Stops 32 are secured to the brackets 30 to position the arms. Pivotally secured to lugs 33 formed in the arms are the links 34, the other ends 34ᵃ of which are secured to the ends 35 of the eccentric lock bars 36, the centre portions of which are secured in any suitable manner to the piston rods 37, which operate in the cylinders 38 secured to the centre sill by any suitable means. A detail of one of the cylinders is shown in Figures 4 and 5. Secured to the ends of the piston rods and held thereon by means of the nuts 39, are the pistons 40, which may be of any desired construction which will make air-tight sliding contact with the inner walls 41 of the cylinders. The ends 42 of the piston rod are provided with recesses 43 and slidably mounted in said recesses are the valve rods 44, the ends 45 of which are provided with shoulders 46 which engage with the inner faces 47 of the nuts 39 during the operation of the device. Secured to the ends 48 of the rods 44, are the piston valves 49, which may be held in place by means of the cotter pins 50. The valves 49 are slidably mounted in reduced extensions 51 formed in the ends of the cylinder, said extensions being closed by means of threaded caps 52. The walls 53 of the piston valves may be provided with preforations 54. Inlet ports 55 are formed in the ends 56 of the cylinders, said ports extending from one end to the other of the larger bored parts of the cylinders. Also formed in the walls of the smaller bores of the cylinders are the outlet ports 57, which are uncovered by the movement of the piston valves 49. The outlet ports 57 extend from end to end of the cylinders and are connected to the system of piping in the manner hereinafter described. Compresion springs 58 may be mounted between the nuts 39 and the walls 53 of the piston valves. Slots 59 are formed in the side walls of the centre sills to allow for the passage therethrough of the end of the piston rods. Mounted in any suitable manner between the centre sill plates are the lock castings 60, the inner edges 61 of which are upwardly turned to form guides for the eccentric lock bars 36. The ends 34ª of the links 34 engage with shoulders 62 of the lock castings. Also secured to the centre sill side plates, approximately midway between the ends of the car, are the tipping or dumping cylinders 63, the sectional elevation of one of which is shown in Figure 11. Slidably mounted in the cylinders 63 are the pistons 64ª and piston rods 64. The ends 65 of the rods 64 project outwardly through the tops of the cylinders and contact with tipping arms 66, secured to the underside of the movable section of the car. The ends of said piston rods may be of any desired shape to ensure that the pressure exerted on the ends 67 of the tipping arms will tilt the movable portion about its pivoted support. Valve control rods 68 are slidably mounted in brackets 69, secured to, or formed integral with the outer walls of the cylinders 63. One end 70 of each of the rods 68 projects into the cylinders 63 and is held in position therein by means of compression spring 71 fitted between the lowermost brackets 69 and collars 72, secured in any suitable manner to the rods 68. Also secured to the valve control rods by means of the arms 73 are the connecting rods 74, one end 75 of each of which is adapted to operate three-way valves 76 through the medium of the levers 77. To ensure proper sequence of operations of the dumping mechanism, direction valves are necessary, and our preferred form of valve is shown in detail in Figures 6 to 9 inclusive.

Each direction valve has a central casting 78, a lower inlet cap 79 and an upper inlet cap 80. The lower inlet cap is bored out to two diameters, one to receive the piston 83, and the other to receive the piston 84, both of which are mounted on the same piston rod 85. Between the shoulder 86 formed between the different bores, and the upper side of the piston 83, a compression spring 87 is mounted to return piston 83 when chamber 82 is exhausted. Also mounted between the pistons 83 and 84, is the spring 88 which forms a cushioning means between the pistons, when piston 84 is pressed against the valve seat 89, to close the exhaust port 90, in the manner hereinafter described. The piston rod 85 extends into a sleeve 89ª, and is adapted to contact with the lower end 91 of a rod 92, formed integral with the valve 93 which is held against its seat 94 by means of the compression spring 95ª mounted in the uppermost cap of the direction valve. This cap has an opening 96 for connection to the main supply line. The bore of the sleeve 89ª at the top thereof, is made slightly larger in diameter than the diameter of the rod 92 and formed in the wall of the sleeve is an aperture 93ª which registers with an opening 94ª communicating with a chamber 95, formed in one side of the main casing of the valve. The chamber 95 has an outlet port 96ª which communicates with a cylindrical channel 97, formed above the valve seat 89 which when opened allows fluid to pass through the exhaust port 90. The chamber 95 is provided with a recessed cap 98, within which is mounted a disc valve 99, having a port 100 adapted to register with the opening 101 formed in the cap 98. The disc is also provided with a slotted port 102, adapted at all times to register with the port 103 formed in the cap 98. Secured to the face 104 of the disc valve is the control arm 105, which may have secured thereto by any suitable means a projecting sleeve 106, which extends perpendicular to the face of the valve 99 and is provided with a shoulder 107, against which and in the recess 108, a compression spring 109 may be mounted to hold the disc valve against the face 110 of the cap 98. The disc valve is provided with an extension spindle 111 which is operated by a bent connecting rod 112, shown in Figures 1 and 3, which is operated by the movement of the links 34 which are provided with depending apertured lugs 113, which contact with the end 114 of the rod 112. The operating arm contacts with the head 115 of a sleeve valve 116 slidably mounted in cylinder 117, secured to the wall of the casing and communicating with the chamber 95 through a port 118 formed in the hollow sleeve valve 116. The sleeve valve is provided with a shoulder 119 which buts against a washer 120 held between the main casing and cylinder 117. A compression spring 121 may be positioned between the end 122 of the cylinder and the end of the recess 123, formed in the sleeve. The spring 121 holds the sleeve valve normally in the open position. The outlet 124 from the cylinder 117 is connected to the unlocking cylinder in the manner herein described. There are two direction valves such as above detailed, used in the operation of the device and their connections are shown in Figure 10. In Figure 10, the arrangement of piping necessary for the operation of the car is shown in perspective.

The device is pneumatically operated and receives its supply of air from the air brake supply line 125, which is provided with a branch pipe 126 connected to the air reservoir or tank 129, and an air flow decreasing valve 129ª is placed in the line 126 in proximity to tank 129. A branch pipe 130 may be connected between the control pipe 128 and the other control pipe 131, on the opposite side of the car. The control pipes are each supplied with control valves 132 and 133. These control valves are so arranged that when tipping or dumping a loaded car, the tipping action is away from the side of the car on which the operator is standing, so that the device will be safe in operation.

In explaining the dumping and righting operation, valve 132 is opened allowing air under pressure to flow into the direction valve Z, through the pipe 133ª. The pipe feeds air into the chamber 81 of the direction valve Z through the opening 134. The air passes through the inlet 82 and raises the pistons 83 and 84, closing the exhaust port 90. The piston rod 85 raises the valve 93 from its seat and allows air to pass into the chamber 95 through the passage 93ª and 94ª, said air being fed from the reservoir tank 129 through the pipe 136 connected to the aperture 96 in the uppermost cap. The air in the chamber 95 flows through the port 118, cylinder 117 and out through the port 124, through the pipe 136 connected thereto to the unlocking cylinder Y. The pipe 136 is connected to the inlet port 55 of the unlocking cylinder and the air presses against the piston 40 and operates piston rod 37, which is connected to the centre of the eccentric locking member adjacent to cylinder Y. The movement of the piston rod pulls the links straight and raises the ends of same clear of the shoulder on the locking casting and allows free movement of said links to pull the arm clear of the depending strut on the bottom of the movable portion of the car to unlock one end. The piston after it has travelled a predetermined distance opens the port 57 by moving the piston valve 49. The air flows through the apertures in the sleeve valve through the port 57, and the pipe 138 connected thereto, to the unlocking cylinder X, which operates the piston in said cylinder in a similar manner to the cylinder at the other end of the car. The outlet 57 from said cylinder X is connected to the dumping or tilting cylinder W by means of the pipe 139, which may be provided with a check valve 140. The piston in the dumping cylinders raises the piston rod to contact with the underside of the movable portion of the car to dump same. Pipe line 139 is connected to the direction valve Z by means of the branch pipe lines 140ª and 141, and a check valve may be connected to the line 140ª. As will be seen from the foregoing, the car is now in the dumped position. As soon as the car is dumped the operator closes the control valve thereby opening the exhaust port 90 and allowing the air in the dumping cylinder to exhaust through the pipe 140ª, which is connected to port 103 in the cap of the direction valve. The links which are connected to the locking cylinder X while operating, close the port 118 in direction valve S, through the medium of lugs 113 which contact with the end 114 of the rod 112, which is secured to the disc valve spindle, so that it will operate arm 105 to contact with the head 115 of the sleeve valve mounted in cylinder 117. The disc valve in turning uncovers port 101 in direction valve S.

To bring the movable section of the car back to its normal or loading position, valve 133 is opened, allowing air to flow into the pipe 131 to raise the pistons and valve in direction valve S. Air from the reservoir passes through the pipe 144 to direction valves and into chamber 95 thereof, out through the ports 101 and pipe 103ª to the cylinder T, the piston of which moves upwardly to bring the car to its loading position. The piston in raising the car operates the three-way valve 76, so that it will assume the position shown diagrammatically as 76ª, so that air from the reservoir is directed through the pipes 146 and 147 to the locking side of the cylinders X and Y. The locking movement of the cylinders is simultaneous, air passing into said cylinders through the ports 148 and moving the pistons to bring the supporting arms under the struts depending from the car body. The movement of the arms is limited by means of stops so that the links and eccentric locking bars tend to swivel about their pivoted connection and the ends of the links drop to contact with the shoulders of the lock castings. The valve 133 is then closed and the exhaust port 90 in direction valve is opened, allowing the air in the system to pass through said port and the piston valve in direction valves to return to its normal position, which in returning closes the port 101. The backward movement of the links also assists in operating the disc valve to accomplish this object.

The foregoing is a description of the operation of the dumping of the car in one direction, and it will be seen that the sequence of movements is such that the locking arms are first withdrawn before the dumping cylinders are brought into operation, and in bringing the car back to normal the dumping cylinders are first operated and the locking means and supporting arms brought into locking position when the car is in its loading or normal position.

To operate the dumping action of the car in the opposite direction, valve 133 is opened first to allow the air to pass to the direction valve S, and from thence first to unlocking cylinder K, then to unlocking cylinder L, and finally to the dumping cylinder T. The operation of the valves is somewhat similar to that just described in detail for dumping in the opposite direction. To bring the car back to normal valve 132 is opened and air passes through the direction valve Z to the dumping cylinder W and from thence to the unlocking cylinders K and L to move the supporting arms to engage with the struts adjacent thereto and depending from the underside of the movable portion of the car.

The apparatus shown in Figure 1 discloses the preferred position of the various parts of the operating mechanism on the centre sill or bolster, but it will be readily deduced therefrom when taken in conjunction with Figure 10, that the various elements may be mounted in any desired position. In the car shown diagrammatically two dumping cylinders are used and four locking cylinders, but this number may be modified to suit the type of car upon which it is desired to mount the mechanism.

The device very simple and safe in operation, and provides a highly efficient pneumatically operated dump car in which the fluid is used as a means for operating the unlocking or locking means, dispensing with the cumbersome chain locking or holding devices which are usually employed on cars of this nature. There are practically no wearing parts in the locking mechanism which are positive in their operation, and any vibration due to travelling only tends to hold the car in the loading or normal position.

Having thus described our invention, what we claim is:—

1. In a dump car, a direction valve, comprising a casing, a chamber formed in one side of the casing, an inlet port to the chamber, an exhaust port from said chamber, a piston valve closing said inlet port, a piston valve closing said exhaust port, fluid operated means for closing the exhaust and the inlet ports simultaneously, and cushioning means between the exhaust port closing piston and the fluid operated means for closing same.

2. In a dump car, a direction valve comprising, a casing, a chamber formed in one side of said casing, an inlet port to said chamber, an outlet port from said chamber, fluid operated means for closing the valve covering the exhaust port, cushioning means between the fluid operated means and the exhaust port valve, and means extending from said fluid operated means to raise the inlet port valve when the fluid supply is cut off from the exhaust port closing means.

3. In a dump car, a direction valve comprising, a valve casing, a chamber formed in the side of the casing, an inlet port to said chamber, an exhaust port, a valve for closing said exhaust port, fluid operated means for simultaneously closing said exhaust port and opening said inlet port, both of which are in vertical alignment with one another, cushioning means between the exhaust valve and the fluid operated means, a spring for closing the inlet port valve, a sleeve valve mounted in the chamber and a disc valve also mounted in the chamber, said disc valve having an arm contacting with the end of the sleeve valve substantially as described.

4. In a dump car, a direction valve comprising, a valve casing, a chamber formed in one side thereof, an inlet to said chamber, an outlet therefrom, valves covering said inlet and said outlet, said valves being so positioned that as one closes, the other opens, fluid operated means for operating said valves simultaneously, a second outlet from said chamber, a sleeve valve for said outlet, a third outlet from said chamber, a disc valve for covering the last mentioned outlet, spring controlled means for holding the disc valve in position, and means extending upwardly from the disc valve and contacting with the end of the sleeve valve during the operation of same.

5. In a dump car, a direction valve comprising, a valve casing, a chamber formed in the casing and at one side thereof, an inlet to said chamber, means for connecting said inlet to a source of fluid supply, an exhaust valve from said chamber, valves operated in unison to simultaneously close one valve while opening the other, fluid operated means for simultaneously opening the inlet and closing the exhaust valve, a second outlet from said chamber, a sleeve valve operating in conjunction with said second outlet, a disc valve rotatably mounted in said chamber and covering outlet ports therefrom, an arm extending from said disc and adapted to contact with the sleeve valve to move same, and a spring adapted to return said valve to its normal position.

6. In a dump car, a direction valve comprising, a valve casing, a chamber formed in the casing and at one side thereof, an inlet and an exhaust port from said chamber, valves covering said inlet and exhaust valves and so arranged that as one is opened the other is closed, fluid operated means for operating said valves simultaneously, a second outlet from said chamber, a sleeve valve controlling the passageway to said outlet a spring to normally hold the sleeve valve with the second outlet in the open position, a disc valve rotatably mounted in said chamber, means to hold the disc valve to its seat, outlets from the chamber, the opening of which is controlled by the movement of the disc valve, an arm extending outwardly from the disc valve and adapted on movement of the disc to contact with the sleeve valve, and fluid operated means for operating said disc valve.

7. In a dump car, a direction valve comprising, a casing having a receiving chamber formed therein, and inlet and exhaust ports communicating therewith, fluid operated means to simultaneously close one port and open the other, means to automatically close the inlet port and open the exhaust port, a second outlet from the chamber, a sleeve valve controlling the opening and closing of the passageway to said second port, a disc valve rotatably mounted in said chamber and operating over ports formed in the side of the casing, means extending from said disc valve to contact with the sleeve valve to close same on movement of the disc in one direction, means to automatically return the sleeve valve to its normal position on movement of the disc in the opposite direction, and means connected to the dump car supporting and locking mechanism to operate said disc valve.

In witness whereof we have hereunto set our hands.

ERNEST R. VIBERG.
ALFONZ L. LINDERBLAD.